United States Patent
Schuessler et al.

(10) Patent No.: US 11,139,525 B2
(45) Date of Patent: Oct. 5, 2021

(54) CLAMPING DEVICE FOR A BATTERY MODULE, BATTERY MODULE, AND MOTOR VEHICLE

(71) Applicant: AUDI AG, Ingolstadt (DE)

(72) Inventors: Martin Schuessler, Koesching (DE); Steffen Walter, Gaimersheim (DE); Dirk Höfner, Wellheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/851,597

(22) Filed: Apr. 17, 2020

(65) Prior Publication Data

US 2020/0343498 A1 Oct. 29, 2020

(30) Foreign Application Priority Data

Apr. 23, 2019 (DE) ...................... 10 2019 205 777.2

(51) Int. Cl.
| | |
|---|---|
| *H01M 50/20* | (2021.01) |
| *H01M 10/04* | (2006.01) |
| *H01M 10/42* | (2006.01) |
| *H01M 50/258* | (2021.01) |

(52) U.S. Cl.
CPC ....... *H01M 50/20* (2021.01); *H01M 10/0468* (2013.01); *H01M 10/0481* (2013.01); *H01M 10/4207* (2013.01); *H01M 50/258* (2021.01); *H01M 2220/20* (2013.01)

(58) Field of Classification Search
CPC .............. H01M 50/20; H01M 50/258; H01M 10/0468; H01M 10/0481
See application file for complete search history.

(56) References Cited

U.S. PATENT DOCUMENTS

| | | | |
|---|---|---|---|
| 9,537,125 B2 | 1/2017 | Park et al. | |
| 9,748,539 B2 | 8/2017 | Kim et al. | |
| 2011/0262797 A1 | 10/2011 | Kim | |
| 2012/0282496 A1* | 11/2012 | Schaefer | B60L 3/0046 |
| | | | 429/7 |

(Continued)

FOREIGN PATENT DOCUMENTS

| | | |
|---|---|---|
| EP | 2 958 165 A1 | 12/2015 |
| EP | 3 343 667 A1 | 7/2018 |
| WO | 2019/061245 A1 | 4/2019 |

OTHER PUBLICATIONS

Examination Report dated Nov. 20, 2019 in corresponding German application No. 10 2019 205 777.2:, 18 pages including Machine-generated English-language translation.

*Primary Examiner* — Olatunji A Godo

(74) *Attorney, Agent, or Firm* — Maier & Maier, PLLC

(57) ABSTRACT

The invention relates to a clamping device for clamping a cell stack having multiple battery cells disposed next to each other in a stacking direction (x), wherein the clamping device comprises at least one fastening element for fastening the clamping device to a battery housing, and first and second end plate units, wherein at least the first end plate unit includes an end plate which is firmly connected to the at least one fastening element and a deformation plate. The deformation plate is configured such that the deformation plate can be deformed by a deformation force (F) applied to the deformation plate in the case of a cell stack received in the clamping device when at least one battery cell of the cell stack swells.

20 Claims, 3 Drawing Sheets

(56) References Cited

U.S. PATENT DOCUMENTS

2015/0171486 A1\* 6/2015 Rawlinson .......... H01M 10/613
　　　　　　　　　　　　　　　　　　324/426
2016/0308242 A1　10/2016　Ju
2017/0352850 A1　12/2017　Nagane et al.

\* cited by examiner

CLAMPING DEVICE FOR A BATTERY MODULE, BATTERY MODULE, AND MOTOR VEHICLE

FIELD

The disclosure relates to a clamping device for clamping a cell stack having multiple battery cells arranged next to each other in a stacking direction, wherein the clamping device comprises at least one fastening element for fastening the clamping device, particularly with the cell stack received therein, to a battery housing, wherein the clamping device further comprises a first end plate unit and a second end plate unit for delimiting the cell stack on both sides. At least the first end plate unit includes a first end plate and a first deformation plate, wherein the first end plate is firmly connected to the at least one fastening element. The disclosure also includes a battery module having such a clamping device, as well as a motor vehicle having such a battery module.

BACKGROUND

Battery modules having prismatic cells or pouch cells, respectively, are typically biased during assembly, that means that a biasing force is applied to the cell stack, which is then fixated by means of a housing or a mechanical bandage. Clamping the cell stack is used as a measure to prevent rapid aging of the cells and allows long service lives and warranty periods of eight years or service life periods of up to 15 years, respectively. Such a clamping device can for example be provided by end plates or end plate units which delimit the cell stack on both sides and can for example be clamped to each other by means of tightening straps or the like extending laterally in the stacking direction. The cells typically expand over the lifetime of such a battery module, which means that the pressure inside the module rises. To let this pressure not rise to a hypercritical level, a portion of the tensions is reduced or compensated as deformation in the clamping plates or end plates, respectively. This generates forces which impact both the cells and the housing and result in elastic or plastic deformation, including undesired deformation of components. Contemporary clamping plates are typically of a purely mechanical design and deform or are compressed accordingly. In this process, unwanted deformation or installation space issues occur, which also result in longitudinal growth of the battery modules. Fastening elements for fastening the clamping device or the entire battery module, for example to a battery housing or a respective frame, can also be provided with such end plates or end plate units. The expansion and deformation issues described may cause a respective shift of the fastening points of the battery module, which has a respective adverse effect on the fastening of the battery module within a whole battery or battery housing.

In this context, document US 2011/0262797 A1, for example, describes a battery module having a clamping device, which also comprises two end plate units which delimit a cell stack in a stacking direction on both sides, wherein such an end plate unit may for example comprise an end plate and an additional elastic plate disposed directly on the end plate between the end plate and the cell stack. This elastic plate acts as a spring to provide some overflow space as described if the battery cells swell but still to apply a counterforce to the cells. Since this resilient plate is directly adjacent to the end plate there is inevitably a transfer of force from this resilient plate to the end plate, which again can lead to the undesirable deformation of these end plates described above.

Furthermore, US 2017/0352850 A1 describes a battery module having a clamping device, which again includes end plate units delimiting a cell stack on both sides. These end plate units are again composed of multiple individual plates and elements. For example, such a unit can initially have an insulating plate between the cell stacks and the outer plates, wherein the two outermost plates should have different material properties to optimize weight and stiffness of this arrangement. In this arrangement as well it is inevitable that in the event of swelling battery cells, such swelling can result in an undesirable deformation of the respective end plates. Such deformation can only be avoided when the outermost end plate is made sufficiently rigid, for example, but this would increase the costs and the weight of such a battery module.

Furthermore, EP 2 958 165 A1 describes a battery module having end plates which delimit a cell stack of multiple battery cells on both sides. Elastic plates are disposed between the respective elements and the cell stack. These elastic plates, too, are supported on one side by the end plates, whereby the forces which act on the elastic plates directly affect the end plates as well and can accordingly once again result in the undesirable deformations mentioned above.

SUMMARY

It is therefore the problem of the present invention to provide a clamping device for clamping a cell stack, a battery module, and a motor vehicle, which make it possible to prevent undesirable deformations of end plates when battery cells of a cell stack received in the clamping device expand or to at least reduce the extent of such deformation.

A clamping device according to the invention for clamping a cell stack having multiple battery cells disposed next to each other in a stacking direction comprises at least one fastening element for fastening the clamping device, particularly with the cell stack received therein, to a battery housing, wherein the clamping device comprises a first end plate unit and a second end plate unit for delimiting the cell stack in a stacking direction on both sides, wherein at least the first end plate unit includes a first end plate and a first deformation plate, wherein the first end plate is firmly connected to the at least one fastening element, for example by an integral joint. The first deformation plate is further configured such that the first deformation plate can be deformed by a deformation force applied to the first deformation plate in the case of a cell stack received in the clamping device swells when at least one battery cell of the cell stack swells, wherein the first end plate and the first deformation plate are disposed at a spacing from, and not contacting, each other, particularly once again in the stacking direction, and are connected to each other via a coupling element in such a manner that at least a major part of the deformation force cannot be transferred to the first end plate.

Since the deformation plate is configured to be deformable, particularly due to deformation forces applied to the deformation plate, deformation of the first deformation plate can absorb, or eliminate by deformation, at least a major part of the deformation force applied by the battery cells when battery cells expand or swell, wherein hardly any of the remaining residual force can be transferred to the outer end plate due to the fact that the deformation plate is spaced apart from he end plate and does not contact it. In addition, the configuration of the coupling element shown and its arrangement relative to the end plate allows a force distribution or force introduction of any residual force into the end plate in such a manner that it cannot result in deformation of this outer end plate, if at all, and such residual force can easily be absorbed, for example, by the at least one fastening element. This fastening element is particularly provided for fastening to an overall battery housing or its frame, respectively. This means that the fastening element is coupled with an extremely large inert mass. Any remaining residual forces are then easily absorbed by means of this at least one fastening element. This means that the outer end plate can advantageously remain free of forces.

The first end plate unit is thus divided into two areas: an area which deforms and is provided by the first deformation plate, and a fixed part, which is not subject to deformation and which, on the one hand, is provided by the first end plate but can on the other hand receive the fastening points for fastening the battery module to a battery housing. The great forces which can arise during the swelling of battery cells are distributed, absorbed, and/or transformed evenly in the limited installation space of the inner clamping plate, that is, the deformation plate, while the outer clamping plate, that is, the first end plate, remains unstressed. This makes the fastening points, which can be defined by the at least one fastening means, independent of the tolerances and forces of the battery cells, for example. By dividing the end plate unit into the two areas mentioned, that is, an area which deforms and a fixed area, which can be subject to no deformation, it becomes advantageously possible to design the bias of the battery cells and the absorption of tolerances separately from the fastening, which is seated in the outer clamping plate, that is, the first end plate. This means that the battery module can be manufactured considerably more precisely with respect to its fastening points, and it will not lose this precise fastening while the battery cells are aging. It should particularly be pointed out that a longitudinal extension of the battery module advantageously no longer has an influence on the fastening points disposed on the first end plate or provided by the at least one fastening element due to the decoupling the deformation plate from the end plate, particularly by means of the force decoupling described, but also the spatial decoupling or spacing apart. Since the first end plate and the first deformation plate are arranged at a spacing from each other, said spacing can be used to compensate for tolerances, leaving the first end plate completely unaffected. If the battery cells expand, the first deformation plate can bulge, expand, or otherwise deform into this tolerance area between the first deformation plate and the first end plate while the position of the first end plate, which at the same time defines one end of a length of the battery module including the cell stack, remains unaffected. Furthermore, since it cannot be deformed, the outer unstressed end plate can advantageously assume additional functions as described below, for a deformation would not be permissible. Thus the invention advantageously helps avoid undesirable deformation of the end plates as well as a change in position in a particularly efficient manner.

The second end plate unit can by the way be configured exactly as the first end plate unit. This means that the second end plate unit may comprise, for example, a second end plate and a second deformation plate, which are spaced apart from each other and are not in contact, but coupled by a respective coupling element as described for the first end plate unit. In the intended arrangement of the clamping device relative to a cell stack received in the clamping device, the deformation plate, particularly the first as well as the second deformation plate, each represent the plate located closer to the cell stack, that is, the deformation plates are closer to the cell stack than the respective end plates. In other words, the deformation plates are each disposed between the cell stack and the respective end plate of the end plate unit. The coupling element mentioned can also be part of such an end plate unit.

Furthermore, according to an advantageous embodiment of the invention, the at least one fastening element is configured as a sleeve, particularly having a female thread, for coupling to a corresponding fastening means, particularly a screw. Thus the battery module, which is for example provided by a combination of the clamping device with a cell stack received in the clamping device, can be fastened to a frame or battery housing by means of a screwed connection. It is particularly advantageous in this context if the respective end plate is coupled or firmly connected to two such fastening elements. These fastening elements can then be disposed in an edge area, which is associated with, or facing, the respective side plates of the clamping device. The fastening of such a battery module to the battery housing does not necessarily have to be by means of a screwed connection; instead, another way of fastening can be provided, for example a plug-in connection. Accordingly the sleeve mentioned does not necessarily have to comprise a female thread, it can also be configured without a female thread, for example for receiving a respective pin, collet, or the like.

In an advantageous embodiment of the invention, the first end plate unit and the second end plate unit are connected by two opposing side plates, wherein the first and second end plate units and the two side plates are arranged relative to each other such that a cuboid receiving area for receiving a cell stack is provided. In other words, if such a cell stack is received in the clamping device as intended, the cell stack is delimited in the stacking direction by these two end plate units as described above, and perpendicular to the stacking direction by these two side plates, which accordingly extend in the stacking direction and connect the two end plate units to each other in the stacking direction. These side plates are rigid or not expandable or the like at least in the stacking direction, such that these side plates keep the respective end plate units, particularly the two outer end plates of the respective end plate units, at a defined spacing from each other. This spacing then advantageously provides an option for tolerance compensation when the battery cells swell. The forces which emerge due to swelling of the battery cells in the course of their service life and act in the staking direction can be absorbed and reduced as described by the deformation plates without changing the outer geometry of the clamping device provided by the two end plates and the respective side plates, such that, as described, the installation space needed for such a battery module advantageously does not change over its lifetime. The coupling element mentioned, which couples the deformation plate and the end plate top each other, can for example also be provided by the respective side plate. In this way, coupling between the deformation plate and the end plate associated with the same end plate unit can be provided which is limited to the edge area of the respective plate, such that no deformation forces can be transferred to the outer end plate. This has several reasons. On the one hand, such deformation forces only arise in a central region of the battery cells, since these only bulge or swell in a central region, while the dimensions of the respective battery cells in the stacking direction change little or not at all in the area of the respective side plates. Accordingly, no deformation forces that act on the deformation plates emerge in these side regions. The centrally acting deformation forces can be broken down by respective deformation of the deformation plate and will then not have an impact on the end plates. Introduction of any potential residual force via the coupling element or the side plates into the end plates can at best occur in an edge area, which, however, cannot result in deformation of the end plates due to the symmetrical structure.

Such decoupling, however, can not only be provided if the at least one coupling element is provided as part of such a side plate, but also if the coupling element is provided as a separate component, as is described in more detail below.

It is another advantageous embodiment of the invention if the coupling element, particularly as a separate component, is firmly connected to at least one of the two side plates and to the at least one fastening element, particularly wherein the at least one fastening element is disposed in a corner area which is formed by an end region of the end plate facing one of the side plates and an end region of the coupling element facing the end plate. A firm connection can for example be provided by an integral joint, such as a welded connection, but also by any other non-integral connection, such as a screwed connection or the like. On the one hand, such a coupling element is preferably welded to the at least one fastening element, which itself is welded to the fastening element, and on the other hand at least one of the two side plates can be welded to the coupling element, for example on the outer side. It is specifically by means of this coupling element and the respective firm connections between the fastening element, the end plate and side plates and said coupling element that particularly high stiffness can be provided in this corner area, that is, in the area of the fastening element. This allows an additional increase in stability of this arrangement, particularly in the fastening area.

For example, the coupling element can comprise a plate-like central portion on which the deformation plate is disposed, as well as two edge parts, which follow the central portion on opposite sides towards the respective side plates, wherein the respective edge parts are arranged at an angle, such that the end regions pointing in the direction of the first end plate run parallel to the respective side plate. This has the great advantage that only one such coupling element per end plate can be provided and there is no need to manufacture and arrange multiple such coupling elements to provide, for example, two-sided and symmetric coupling between the deformation plate and the end plate and a connection to the respective side plates. The particularly great advantage of this embodiment is, however, that this coupling element at the same time allows achievement of a stiffening deformation plate. In other words, the plate-like central portion and the deformation plate together, as it were, form a deformation unit, which is also configured in two parts, such that this two-part configuration can on the one hand provide additional stiffening and more degrees of design freedom to be able to suitably adjust the deformation properties of this deformation unit to the type of battery cells, their number and size, and the deformation force that typically develops in the process of aging of such a cell stack.

It is further advantageous if the first deformation plate is at least partially corrugated. Such a corrugated structure allows the deformation plate to absorb deformation forces particularly well. This corrugated deformation plate can for example be directly disposed on the central portion of the coupling element. Intermediate spaces between the waves provided by the deformation plate and the central portion of the coupling element can for example be filled with another deformation medium, for example a plastic, a foam, a fluid, or the like. Forces can in this way be distributed, absorbed, and eliminated more efficiently.

In another particularly advantageous embodiment of the invention, the first end plate has a metallic plate core and at least one plastic part which is disposed directly on the plate core. This plastic part can for example be configured, at least in sections, as a shell of the metallic plate core and accordingly be disposed on two opposite sides of the metallic plate core. Such a hybrid configuration of the end plate is particularly advantageous, since the metallic plate core mentioned on the one hand allows to provide a high degree of stability for the end plate, on the other hand the at least one plastic part makes the integration of other functional components easier.

Accordingly, it is another advantageous embodiment of the invention if the first deformation plate comprises at least one functional component, particularly a control unit configured as a cell management controller and/or a gripper receiving means for coupling to a gripper of a handling device for moving and positioning a battery module that comprises the clamping device. Numerous other such functional components can be integrated into the outer end plates of the clamping device as well. This is made possible by the fact that the configuration of the clamping device described allows to prevent deformation of the outer end plates in a particularly efficient manner, even if battery cells of the cell stack swell in the process of their aging. This advantageously allows the integration of other components into the outer end plates, which would not withstand such deformation, for example the cell management controller mentioned above. This allows a particularly efficient and compact structure of a battery module. Gripper receiving means for a handling device or the like can likewise easily be integrated into the clamping device, particularly directly into the respective end plates. Such a handling device is typically used to position battery modules, for example to lift them and insert them into their respective receiving positions into a battery housing or the like.

Furthermore, the invention relates to a battery module having a clamping device according to the invention or one of its embodiments. In addition, the battery module according to the invention or one of its embodiments may comprise a cell stack having multiple battery cells arranged next to each other in a stacking direction, for example prismatic cells or pouch cells, wherein the cell stack is delimited in the stacking direction on both sides by the first and second end plate units. Moreover, the structure of the battery module can be designed as described above in conjunction with the clamping device with the cell stack disposed as intended in the clamping device.

Furthermore, a high-voltage battery having multiple such battery modules is to be considered part of this invention. Such a high-voltage battery can comprise a battery housing which for example includes a frame, wherein the battery module or the respective multiple battery modules are fastened to the frame by means of the at least one fastening element of the clamping device.

The invention further also relates to a motor vehicle having a battery module according to the invention or a high-voltage battery according to the invention or one of their embodiments. The advantages described for the clamping device and its embodiments thus apply likewise to the battery module according to the invention, the high-voltage battery according to the invention, and the motor vehicle according to the invention.

The motor vehicle according to the invention is preferably designed as a motor car, particularly a passenger car or truck, or as a bus or motorbike.

BRIEF DESCRIPTION OF THE DRAWINGS

The invention also includes combinations of the features of the embodiments described.

Exemplary embodiments of the invention will be described below. Wherein.

DETAILED DESCRIPTION

Figure 1:
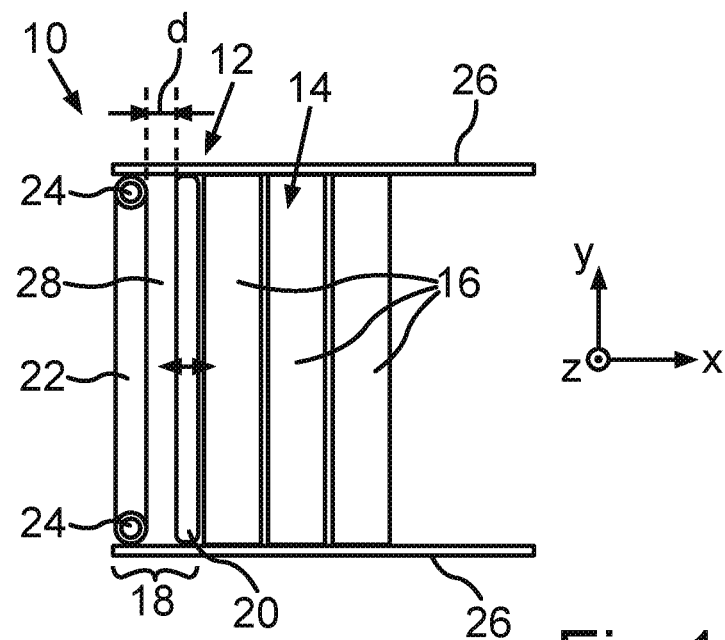
FIG. 1 is a schematic representation of a part of a battery module having a clamping device according to an embodiment of the invention, wherein the battery cells of the battery module are in a non-expanded state.

The exemplary embodiments explained below are preferred embodiments of the invention. The components described in the exemplary embodiment represent individual features of the invention to be viewed separately, independently of each other, each of which further developing the invention independently. The disclosure therefore is to include other than the combinations of features of the embodiments shown. Furthermore, the embodiments described can be supplemented by other features of the features of the invention already described.

Like reference numerals in the figures designate elements having the same function.

FIG. 1 shows a schematic top view of a part of a battery module 10 having a clamping device 12 according to an embodiment of the invention. Furthermore, the battery module 10 includes a cell stack 14 with multiple battery cells 16 arranged in a stacking direction, which is the x-direction of the coordinate system shown. This cell stack 14 is delimited in the stacking direction x on either side by one end plate unit 18, only one of which is shown here. The end plate unit 18 once again includes a deformation plate 20 and an outer end plate 22. Furthermore, fastening elements 24 are disposed on the outer end plate 22. These are firmly connected to the outer end plate 22, for example integrally, for example by welding. These fastening elements 24 can for example be configured in the form of sleeves with a female thread to fasten the battery module 10 to a battery housing or frame not shown here for receiving multiple such battery modules 10 to provide a high-voltage battery. This fastening is preferably a screwed connection, but it can be implemented in any other way. Furthermore, the two end plate units 18 are connected by two opposing side plates 26, which also extend in the stacking direction x. These side plates 26, too, can be directly or at least indirectly be connected to the fastening elements 24, for example by means of a coupling element described in detail below.

Figure 2:
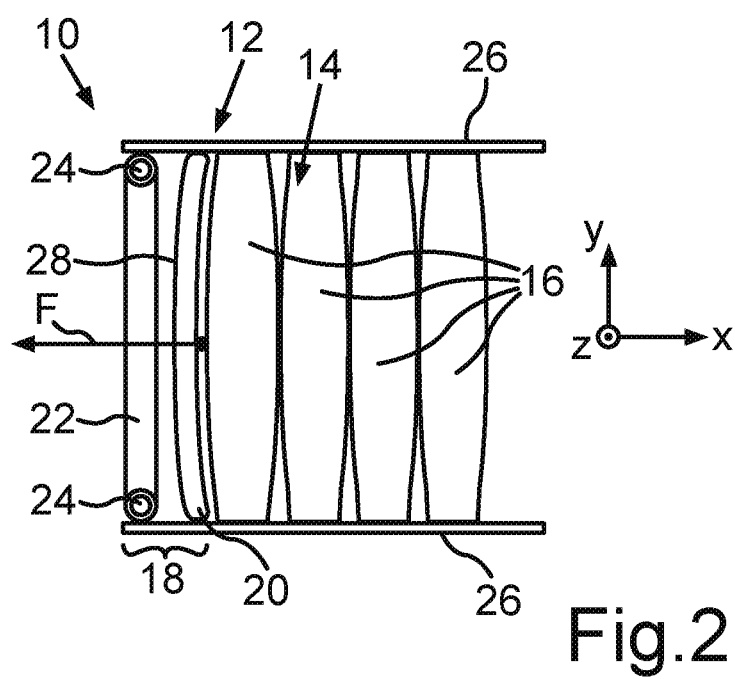
FIG. 2 is a schematic representation of the part of the battery module from FIG. 1, wherein the battery cells of the battery module now are in an expanded state.

It is particularly advantageous that the outer end plate 22 and the deformation 20 of the same end plate unit 18 are arranged relative to each other such that they do not directly contact each other, but are arranged at a spacing, particularly a spacing d, which advantageously provides a swelling or tolerance compensation area 28. In the process of aging of the battery cells 16, the battery cells 16 typically swell, as illustrated in FIG. 2. This swelling can be more or less pronounced and leads to bulging of the respective battery cells 16 in a central region with respect to their extension in the y-direction shown here as well as in the z-direction shown here. In the respective edge areas of the battery cells 16, such bulging relative to the y and z directions is either less pronounced or does not show at all. The forces emerging in this process can advantageously be absorbed by the deformation plate 20. This deformation force F can for example have a magnitude of 30 kilonewton, but also be greater or smaller, depending on the design of the battery cells 16, their size, number, cell chemistry used, and their age. As shown in FIG. 2, the design of the clamping device 12 according to the invention advantageously allows that such a deformation force F only acts on the deformation plate 20 and results in its deformation, while the outer end plate 22 is not deformed and particularly not affected in any way by this deformation force F. The swelling and tolerance compensation 28 provided in that the end plate 22 and the deformation plate 20 are arranged at a spacing from each other can therefore compensate for tolerances due to said swelling along the length of the cell stack 14 without influencing the position of the end plate 22. This becomes particularly apparent by comparing FIGS. 1 and 2, in which the change in spacing between the deformation plate 20 and the end plate 22 is clearly visible. FIG. 1 shows the situation with maximum tolerances, according to which the cells 16 are in the non-expanded state and therefore the spacing between the end plate 22 and the deformation plate 20 is the largest, and FIG. 2 shows the situation with minimum tolerances, according to which the cells 16 are in the expanded state, particularly in the maximum expanded state, and therefore the spacing between the end plate 22 and the deformation plate 20 is smallest but the deformation plate 20 still does not contact the end plate 22, such that the position and geometry of the end plates 22 remains unaffected even in this maximum expanded state of the battery cells 16. If the battery cells 16 expand, the deformation plate 20 can bulge, expand, or otherwise deform into the tolerance area 28 between the deformation plate 20 and the end plate 22, while the position of the end plate 22 itself is independent thereof. Accordingly, the fastening points provided by the fastening elements 24 remain completely unaffected. By dividing the clamping plate, that is, the end plate unit 18, into two regions, namely the deformation plate 20 and the end plate 22 which is spatially separated from the former, it is possible to provide absorption of tolerances separately from the fastening 24, which is seated in the outer clamping plate, i.e. the end plate 22. In this way, the module 10 is independent of the tolerance of the cells 16 relative to its fastening points 24. In other words, the fastening points are completely independent of the tolerances and forces of the battery cells 16. This means that the battery module 10 can be produced much more precisely with respect to its fastening points 24, wherein the dimensioning and positioning of said fastening points relative to the end plates 22 does not change in the process of aging of the battery cells 16 and their expansion.

Figure 3:
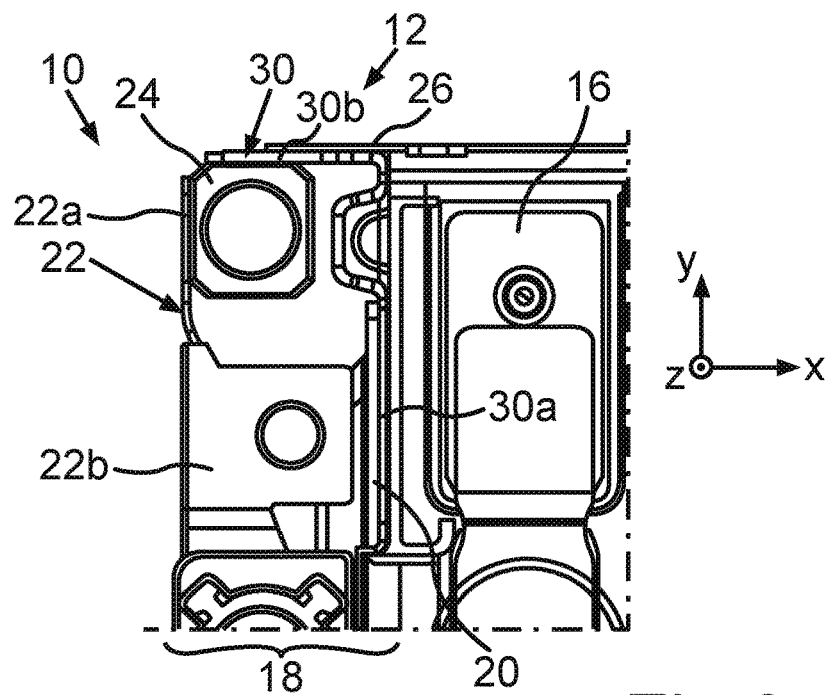
FIG. 3 is a schematic top view of a part of a battery module having a clamping device according to another embodiment of the invention.

FIG. 3 once again shows a schematic detail view, particularly once again a top view, of a part of a battery module 10 having a clamping device 12 according to an embodiment of the invention. The clamping device 12, as well as the rest of the battery module 10, can be configured as described with respect to FIGS. 1 and 2. FIG. 3 now shows a detailed view of a fastening element 24, which is configured as a threaded sleeve, as well as the connection of the outer end plate 22 and the deformation plate 20 to said fastening element 24, particularly via a respective coupling element 30. This coupling element 30, which can be configured as a suitably shaped metal plate, can for example comprise a central plate-like portion 30a whereon the deformation plate 20 can for example be directly disposed, as well as edge parts 30b which directly follow said central portion 30a, particularly on both sides, that is, in the y-direction shown, in the direction of the respective side plates 26, which edge parts are particularly molded at an angle thereon, such that at least a portion of these edge parts 30b extends parallel to the respective side plates 26. The respective side plates 26, of which only one is shown in FIG. 3, can particularly be welded to said coupling element or its edge part 30b, respectively. Said coupling element 30 can itself be welded to the fastening element 24 via said edge part 30b, particularly again on the outer side. The outer end plate 22 can also be welded to the outer side of the fastening element 24. Thus the fastening element 24, as is clearly visible in FIG. 3, is located in a corner area which is formed on the one hand by a corner area of the end plate 22 pointing towards the side plate 26, and by and end region of said coupling element 30, which points towards the end plate 22. As is clearly visible in FIG. 3, there is no direct connection between the outer end plate 22 and said coupling element 30, which is connected to the deformation plate 20, in this case as well. These are only coupled to each other by means of the fastening element 24. This fastening element 24 itself is again fastened to an overall battery housing or its frame, for example, screw-connected thereto, as described above. This means that the fastening element 24 is coupled with an extremely large inert mass. Any remaining residual forces due to the deformation force F described with reference to FIG. 2 are then easily absorbed by means of these fastening elements 24. This means that the outer end plate 22 remains completely free of forces. Particularly, no deformation of said end plate 22 due to the deformation force F described with reference to FIG. 2 and caused by swelling of the battery cells 16 is possible. This advantageously allows the integration of other functional components into this outer end plate 22, which allows a compact design of the battery module 10, which makes particularly efficient use of installation space. Such functional components can for example represent a control unit, such as a cell management controller for controlling the respective cell stack 14 or the entire battery module 10, respectively. In such a control unit, sensor data regarding the battery module 10 can be collected, analyzed, and transmitted to a higher-order control unit, for example. Gripper receiving means or the like can also be integrated into this end plate 22. The integration of such components only becomes possible in that a deformation of this end plate 22 when the battery cells 16 swell is completely excluded. To make the integration of additional components easier, this outer end plate 22 can be configured in a hybrid form, for example having a metallic plate core 22a and a plastic part 22b, which can at least partially enclose the plate core 22a of is at least on one side directly adjacent to this plate core 22a.

Figure 4:
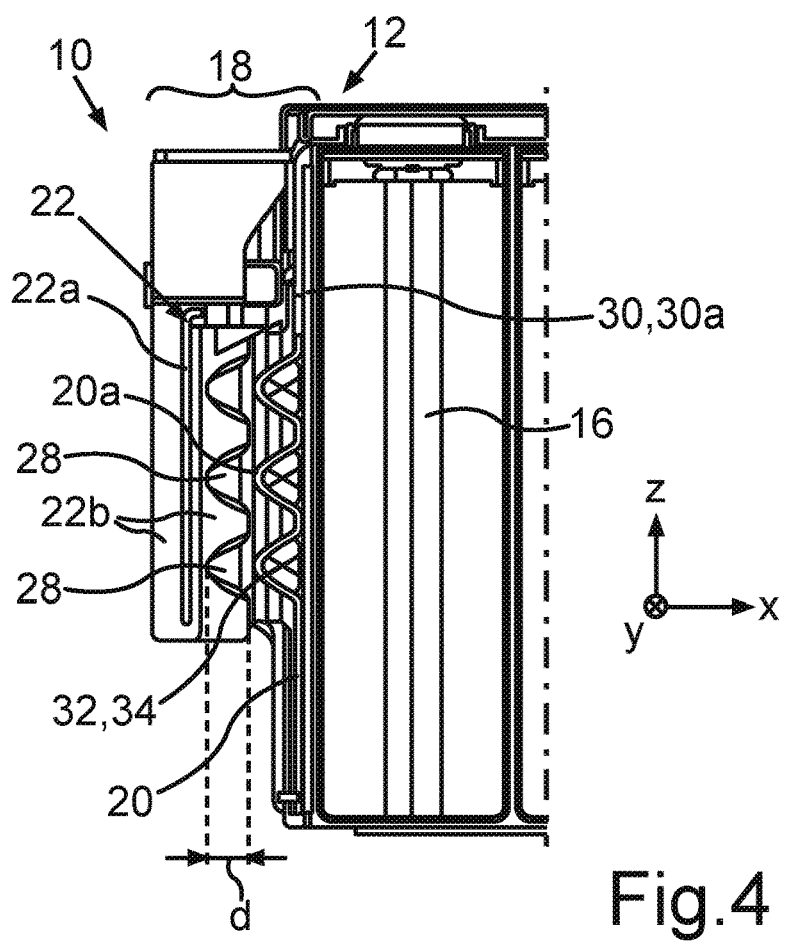
FIG. 4 is a schematic representation of a lateral or cross sectional view through a battery module having a clamping device according to an embodiment of the invention.

This battery module 10 is once again shown in FIG. 4 in a respective detailed side view or in a cross-sectional view, respectively. As is clearly visible in this representation, the deformation plate 20, which, as is also clearly visible, is disposed on the central portion 30a of the coupling element 30, can be at least partially corrugated. This corrugated structure is designated 20a in FIG. 4. As a result, intermediate spaces or intermediate regions 32 are formed which are located between the deformation plate 20 and the central portion 30a of the coupling element 30, and which may also be filled with a deformation medium 34. Such a deformation medium can for example be a foam, a plastic, a fluid, or the like. As a result of this corrugated structure 20a and these additional deformation media 34, and particularly due to the double configuration of the deformation unit, which includes the deformation plate 20 and the central portion 30a of the coupling element 30, the deformation properties can be adjusted to the respective battery cells 16 and their expansion properties in the process of aging in a particularly targeted manner, such that the elements described provide particularly good cell-specific deformation properties. This allows for particularly efficient absorption, deflection, and elimination of the deformation forces F. This representation once again clearly shows the tolerance area 28 between the deformation plate 20 and the end plate 22 provided by the spaced-apart arrangement of the deformation plate 20 and the end plate 22, such that this tolerance area 28 can advantageously compensate expansion tolerances of the battery cells 16 without affecting the orientation and position of the end plates 22 and the respective fastening points 24.

Figure 5:
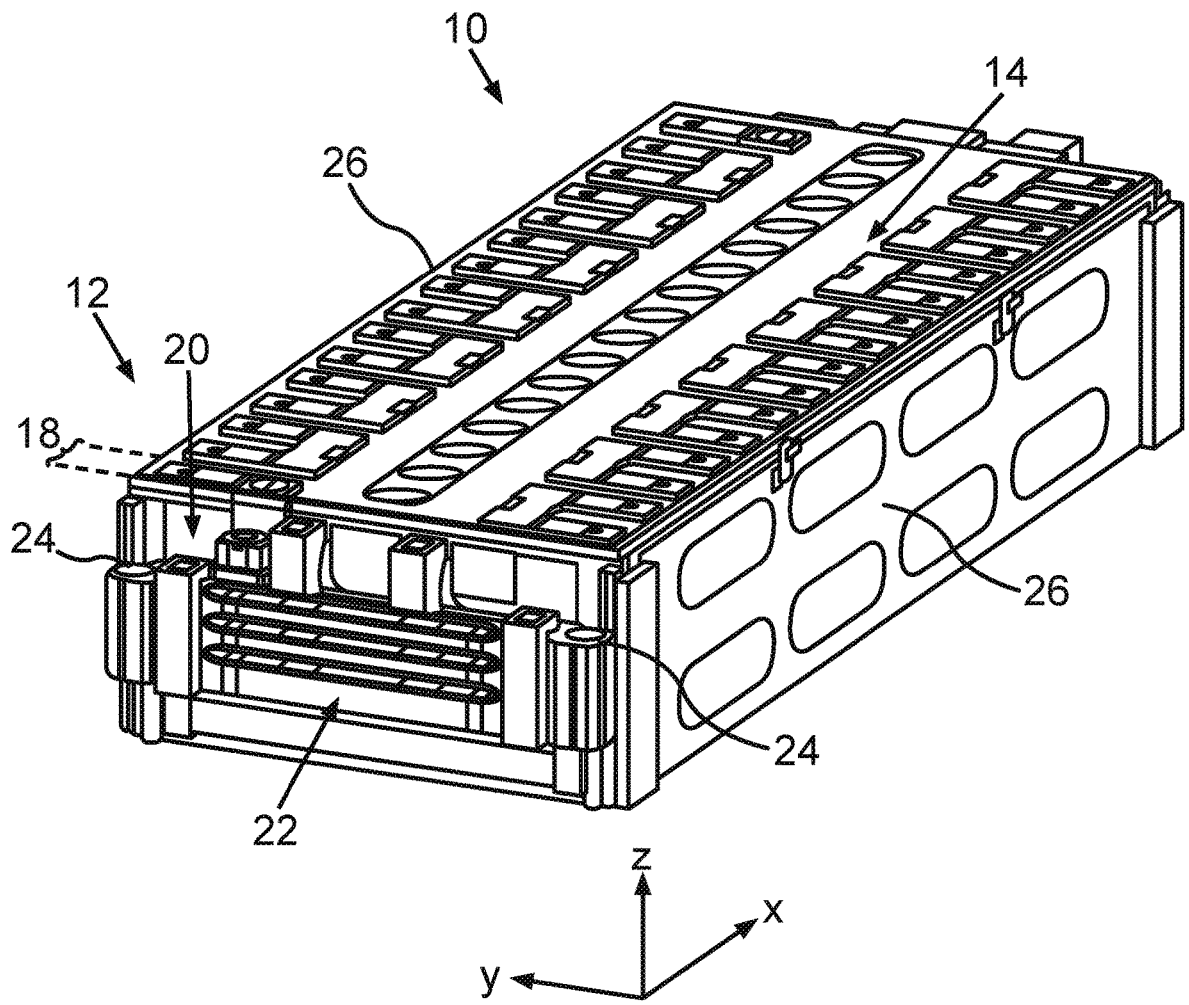
FIG. 5 is a schematic and perspective representation of a battery module having a clamping device according to an embodiment of the invention.

FIG. 5 once again shows a schematic representation of the battery module 10 having a clamping device 12 according to an embodiment of the invention in an overall perspective view. The battery module 10 may particularly be configured as described in FIG. 1 to FIG. 4.

Overall, the examples show how the invention can provide a battery module having a clamping device and decoupled end plates, by means of which it is advantageously possible to suitably absorb and eliminate forces resulting from expansion of the battery cells in the course of their service life on the one hand, and on the other hand leave the outer geometry and the outer end plates with the fastening plates disposed thereon completely unaffected, such that advantageously the required installation space for such a battery module does not change over the lifetime of such a battery module, the fastening points can be more precisely specified with respect to the battery module, and, moreover, other components can be integrated into the outer end plates.

The invention claimed is:

1. A clamping device for clamping a cell stack having multiple battery cells disposed next to each other in a stacking direction (x), wherein the clamping device comprises at least one fastening element for fastening the clamping device to a battery housing, wherein the clamping device comprises a first end plate unit and a second end plate unit for delimiting the cell stack in a stacking direction (x) on both sides, wherein at least the first end plate unit includes a first end plate and a first deformation plate, and wherein the first end plate is firmly connected to the at least one fastening element, the first deformation plate is configured such that the first deformation plate can be deformed by a deformation force (F) applied to the first deformation plate in the case of a cell stack received in the clamping device when at least one battery cell of the cell stack swells, wherein the first end plate and the first deformation plate are disposed at a spacing from and not contacting each other, and are connected to each other via a coupling element in such a manner that at least a major part of the deformation force (F) cannot be transferred to the first end plate, wherein the first end plate unit and the second end plate unit are connected by two opposing side plates, and at least the first end plate extends between and contacts each of the two opposing sides.

2. The clamping device according to claim 1, wherein the first and second end plate units and the two side plates are arranged relative to each other such that a cuboid receiving area for receiving a cell stack is provided.

3. The clamping device according to claim 1, wherein the coupling element is firmly connected to at least one of the two side plates and to the at least one fastening element, particularly wherein the at least one fastening element is disposed in a corner area which is formed by an end region of the end plate facing one of the side plates and an end region of the coupling element facing the end plate.

4. The clamping device according to claim 1, wherein the coupling element comprises a plate-like central portion on which the deformation plate is disposed, as well as two edge parts, which follow the central portion on opposite sides towards the respective side plates, wherein the respective edge parts are arranged at an angle, such that the end regions pointing in the direction of the first end plate run parallel to the respective side plate.

5. The clamping device according to claim 1, wherein the at least one fastening element is configured as a sleeve, particularly having a female thread, for coupling with a corresponding fastening means, particularly a screw.

6. The clamping device according to claim 1, wherein the first deformation plate is at least partially corrugated.

7. The clamping device according to claim 1, wherein the first end plate comprises a metallic plate core and at least one plastic part which is directly disposed on the plate core.

8. The clamping device according to claim 1, wherein the first deformation plate comprises at least one functional component, particularly a control unit configured as a cell management controller and/or a gripper receiving means for coupling to a gripper of a handling device for moving and positioning a battery module that comprises the clamping device.

9. A battery module having a clamping device according to claim 1, wherein the battery module comprises a cell stack having multiple battery cells disposed next to each other in a stacking direction (x), wherein the cell stack is delimited on both sides in the stacking direction (x) by the first and second end plate units.

10. The clamping device according to claim 2, wherein the coupling element is firmly connected to at least one of the two side plates and to the at least one fastening element, particularly wherein the at least one fastening element is disposed in a corner area which is formed by an end region of the end plate facing one of the side plates and an end region of the coupling element facing the end plate.

11. The clamping device according to claim 2, wherein the coupling element comprises a plate-like central portion on which the deformation plate is disposed, as well as two edge parts, which follow the central portion on opposite sides towards the respective side plates, wherein the respective edge parts are arranged at an angle, such that the end regions pointing in the direction of the first end plate run parallel to the respective side plate.

12. The clamping device according to claim 3, wherein the coupling element comprises a plate-like central portion on which the deformation plate is disposed, as well as two edge parts, which follow the central portion on opposite sides towards the respective side plates, wherein the respective edge parts are arranged at an angle, such that the end regions pointing in the direction of the first end plate run parallel to the respective side plate.

13. The clamping device according to claim 2, wherein the at least one fastening element is configured as a sleeve, particularly having a female thread, for coupling with a corresponding fastening means, particularly a screw.

14. The clamping device according to claim 3, wherein the at least one fastening element is configured as a sleeve, particularly having a female thread, for coupling with a corresponding fastening means, particularly a screw.

15. The clamping device according to claim 4, wherein the at least one fastening element is configured as a sleeve, particularly having a female thread, for coupling with a corresponding fastening means, particularly a screw.

16. The clamping device according to claim 2, wherein the first deformation plate is at least partially corrugated.

17. The clamping device according to claim 3, wherein the first deformation plate is at least partially corrugated.

18. The clamping device according to claim 4, wherein the first deformation plate is at least partially corrugated.

19. The clamping device according to claim 5, wherein the first deformation plate is at least partially corrugated.

20. The clamping device according to claim 2, wherein the first end plate comprises a metallic plate core and at least one plastic part which is directly disposed on the plate core.

* * * * *